United States Patent
Kawabata et al.

(10) Patent No.: US 7,420,695 B2
(45) Date of Patent: Sep. 2, 2008

(54) IMAGE PROCESSING SYSTEM AND APPARATUS FOR ALLOCATION READING

(75) Inventors: Kazuyuki Kawabata, Toyokawa (JP); Akio Nakajima, Toyokawa (JP); Toshihisa Motosugi, Okazaki (JP); Kenichi Matsumoto, Toyokawa (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 834 days.

(21) Appl. No.: 10/103,836

(22) Filed: Mar. 25, 2002

(65) Prior Publication Data

US 2002/0140968 A1    Oct. 3, 2002

(30) Foreign Application Priority Data

Mar. 28, 2001  (JP) .............................. 2001-092055

(51) Int. Cl.
   *G06K 15/00* (2006.01)
   *G06F 3/12* (2006.01)
(52) U.S. Cl. ..................................... 358/1.15; 358/1.13
(58) Field of Classification Search ................ 358/1.15, 358/408, 442, 296, 1.16
   See application file for complete search history.

(56) References Cited

U.S. PATENT DOCUMENTS

| | | | | |
|---|---|---|---|---|
| 5,812,747 | A | * | 9/1998 | Kayano et al. ............. 358/1.15 |
| 6,122,684 | A | * | 9/2000 | Sakura ........................ 710/73 |
| 6,256,107 | B1 | | 7/2001 | Toda |
| 7,006,249 | B2 | * | 2/2006 | Matsuda ..................... 358/1.9 |

FOREIGN PATENT DOCUMENTS

| | | |
|---|---|---|
| JP | 07-143280 | 6/1995 |
| JP | 8-289053 | 11/1996 |
| JP | 10-143026 | 5/1998 |
| JP | 10-336376 | 12/1998 |
| JP | 11-331472 | 11/1999 |
| JP | 2000-047959 | 2/2000 |
| JP | 2000-125087 | 4/2000 |
| JP | 2000-206835 | 7/2000 |
| JP | 2000-224369 | 8/2000 |
| JP | 2000-261587 | 9/2000 |

OTHER PUBLICATIONS

Japanese Office Action for counterpart application JP 2001-092055 dated Jun. 29, 2007 with English translation.

* cited by examiner

*Primary Examiner*—Gabriel I. Garcia
(74) *Attorney, Agent, or Firm*—Buchanan Ingersoll & Rooney PC

(57) ABSTRACT

Allocation reading is started when an allocation origin image processing apparatus sends an allocation reading start alert. An image processing apparatus which received the allocation reading start alert, i.e., the allocation destination image processing apparatus, displays a continue reading specification key on its own display for user specification to continue reading by the allocation reading function. Continue reading is started by user operation of this continue reading specification key. That is, when a document image is read by the allocation destination image processing apparatus, the image data are transmitted to the allocation origin image processing apparatus. Then, the allocation origin image processing apparatus integrates the received image data with the image data read by the allocation origin image processing apparatus.

17 Claims, 21 Drawing Sheets

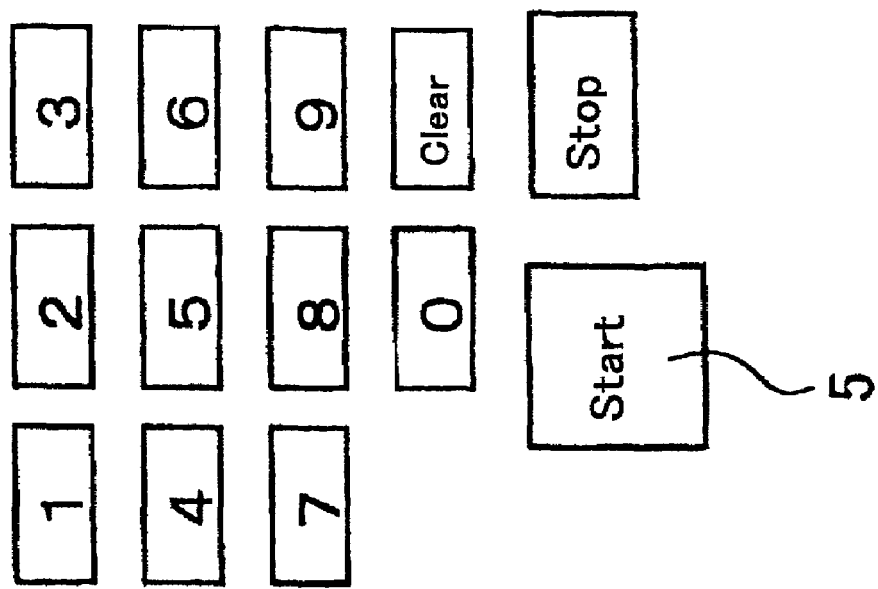
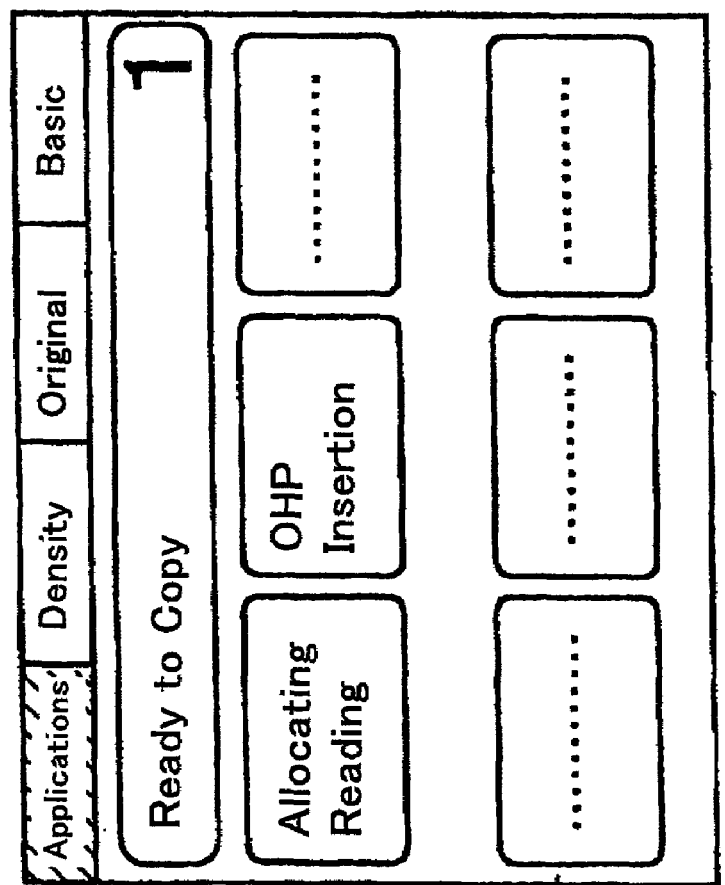

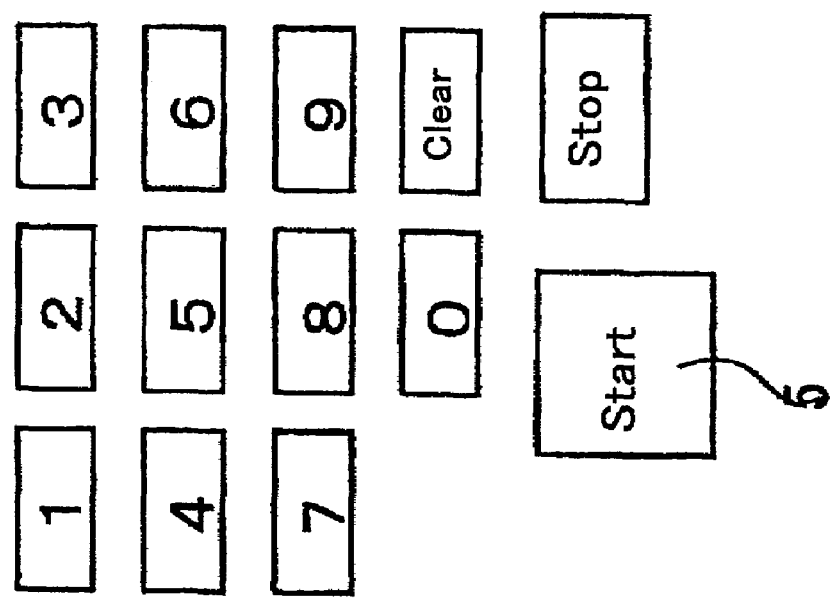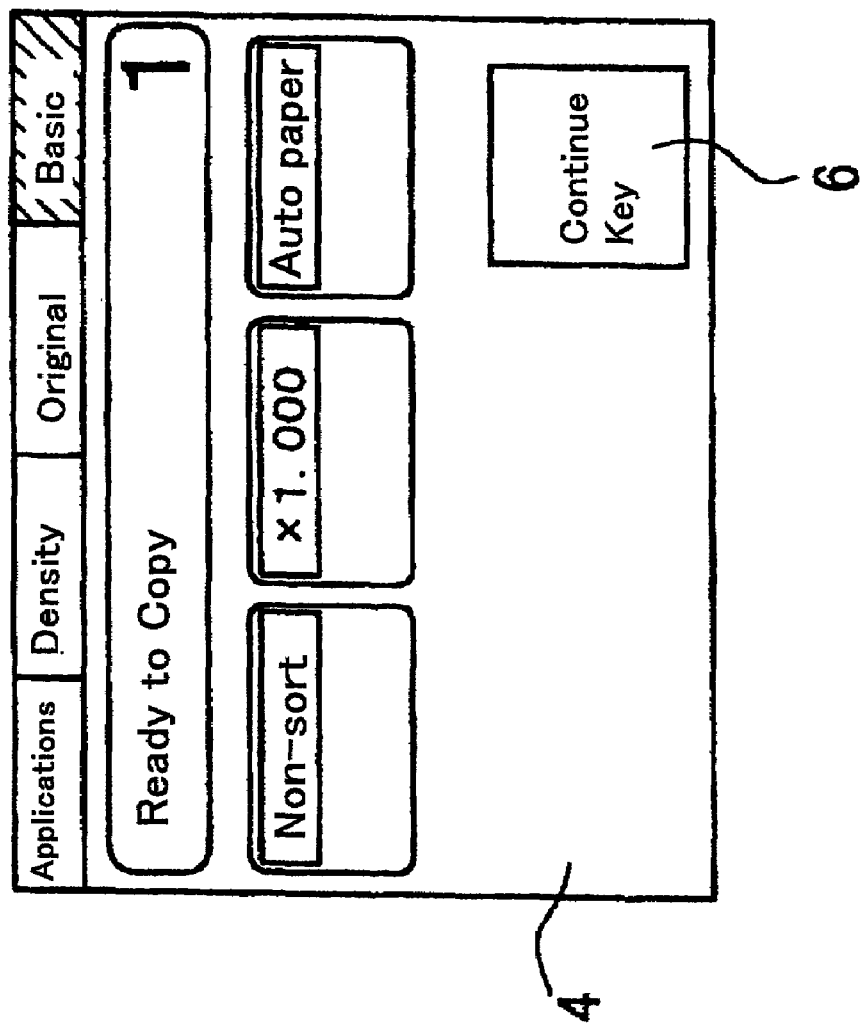

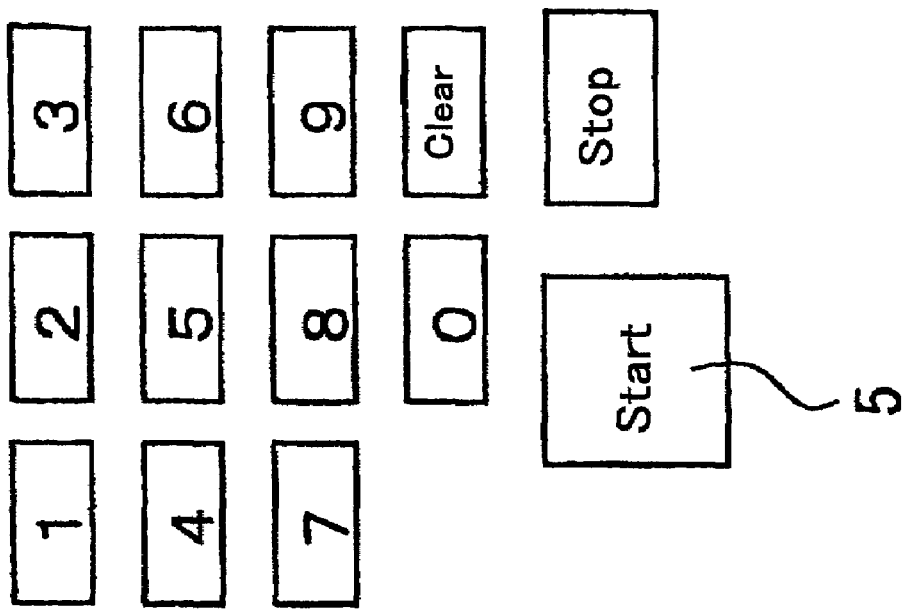
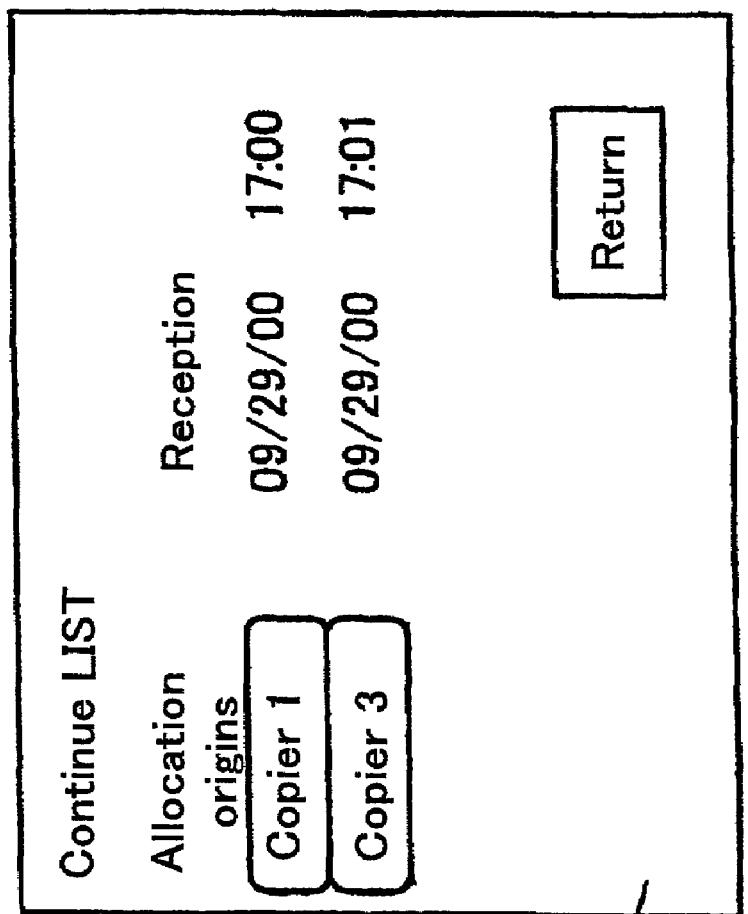
Fig.5

IMAGE PROCESSING SYSTEM AND APPARATUS FOR ALLOCATION READING

CROSS-REFERENCE TO RELATED APPLICATIONS

This application is based on Patent Application No. 2001-92055 filed in Japan, the content of which is hereby incorporated by reference.

BACKGROUND OF THE INVENTION

1. Field of the Invention

The present invention relates to an image processing apparatus having a function for acquiring image data by reading the image of a document, and an image processing system to which a plurality of such image processing apparatuses are connected. More specifically, the present invention is related to an image processing apparatus and image processing system corresponding to an allocation reading function for allocating and reading a document among a plurality of image processing apparatuses.

2. Description of the Related Art

Conventional image processing systems to which a plurality of image processing apparatuses are connected are provided with an allocation reading function for allocating and reading a set of documents among a plurality of image processing apparatuses. Such systems are similar to, for example, art for allocating and reading documents among a plurality of scanners and integrating the image data on a server (Japanese Laid-Open Patent No. 2000-224369), and art for integrating a plurality of image data read from scanners on a personal computer (Japanese Laid-Open Patent No. 2000-125087) and the like.

The following problems arise in conventional allocation reading. When a document is allocated and read, the image data read by each image processing apparatus must be integrated. In the conventional art, in order to integrate image data read by allocation by a plurality of image processing apparatuses, a server must be provided to integrate the image data read by allocation by each image processing apparatus, or an operation must be performed to specify the integration destination image processing apparatus for each image processing apparatus.

Regarding the relationship among image data read by allocation, e.g., when a document is allocated and read by three scanners, there is concern that the integrated image data may be unsuitable if detailed conditions (such as reading mode, page sequence after integration and the like) are not specified when the three sets of allocated image data are read.

OBJECT AND SUMMARY

The present invention eliminates the previously described problems by providing an image processing apparatus and an image processing system capable of allocation reading of a serial document set comprising a plurality of pages by a simple operation to acquire integrated image data.

A first aspect is an image processing apparatus capable of communicating with another image processing apparatus, the image processing apparatus comprising: an image reading unit for reading image of a document to acquire image data; a setting unit for setting an allocation reading function for integrating first image data acquired by reading a first document set by the image reading unit and second image data acquired by reading a second document set by another image processing apparatus to generate integrated image data of the document sets; and a first transmission controller for transmitting a signal to another image processing apparatus to provide the other image processing apparatus with an operation device regarding the allocation reading function. The operation device provided on the other image processing apparatus by the signal from the transmission controller is an operation device for a user to specify the reading of a second document set in the allocation reading function. The image processing apparatus fulfils the role of the allocation origin during allocation reading.

A second aspect is an image processing apparatus capable of communicating with another image processing apparatus, the image processing apparatus comprising: an image reading unit for reading the image of a document to acquire image data; a display controller for displaying an operation key for a user specification relating to an allocation reading function on its own display unit in response to receiving a signal from said another image processing apparatus, the allocation reading function being a function for integrating first image data acquired by reading a first document set by said another image processing apparatus and second image data acquired by reading a second document set by the image reading unit to generate integrated image data of the document sets; a reading controller for executing reading of the second document set by the image reading unit; and a first transmission controller for transmitting the second image data acquired by reading the second document set to said another image processing apparatus.

A third aspect is an image processing system connected to first and second image processing apparatuses to allow communications therebetween, having an allocation reading function for integrating first image data acquired by reading a first document set by the first image processing apparatus and second image data acquired by reading a second document set by the second image processing apparatus to generate integrated image data of the document sets. The first image processing apparatus comprising: a first image reading unit for reading the image of a document to acquire image data; and a first transmission controller for sending a signal relating to the allocation reading function to the second image processing apparatus. The second image processing apparatus comprising: a second image reading unit for reading the image of a document to acquire image data; a display controller for displaying on its own display an operation key for a user specification relating to the allocation reading function by receiving the signal relating to the allocation reading function from the first image processing apparatus; and a reading controller for executing reading of the second document set by the second image reading unit in response to operation of the operation key.

In embodiments, allocation reading is started when an allocation origin image processing apparatus sends an allocation reading start alert. An image processing apparatus which received the allocation reading start alert, i.e., the allocation destination image processing apparatus, displays a continue reading specification key on its own display for user specification to continue reading by the allocation reading function. Continue reading is started by user operation of this continue reading specification key. That is, when a document image is read by the allocation destination image processing apparatus, the image data are transmitted to the allocation origin image processing apparatus. Then, the allocation origin image processing apparatus integrates the received image data with the image data read by the allocation origin image processing apparatus. This integration is performed by the allocation origin image processing apparatus. The integrated image data are all managed as an integrated set. Allocation reading is thus accomplished. Steps such as the selection of the allocation origin, confirmation of insertion of a document for reading and the like may exist between the operation of the continue reading specification key and the actual start of continue reading execution. According to the embodiments, allocation reading can be simply accomplished merely by an operation pursuant to the screen on the display of each image processing apparatus.

These and other objects, advantages and features of the invention will become apparent from the following description thereof taken in conjunction with the accompanying drawings which illustrate specific embodiments of the invention.

BRIEF DESCRIPTION OF THE DRAWINGS

FIG. 3 shows an example of a screen for selecting the allocation reading function in an image processing apparatus.

FIG. 4 shows an example of a screen for selecting the continue function in an image processing apparatus.

FIG. 5 shows an example of a screen for selecting an allocation origin in an image processing apparatus.

In the following description, like parts are designated by like reference numbers throughout the several drawings.

DESCRIPTION OF THE PREFERRED EMBODIMENTS

The preferred embodiment of the present invention is described hereinafter with reference to the accompanying drawings. The embodiment is an application of the present invention to a system comprising a plurality of copiers connected within a single network.

Figure 1:
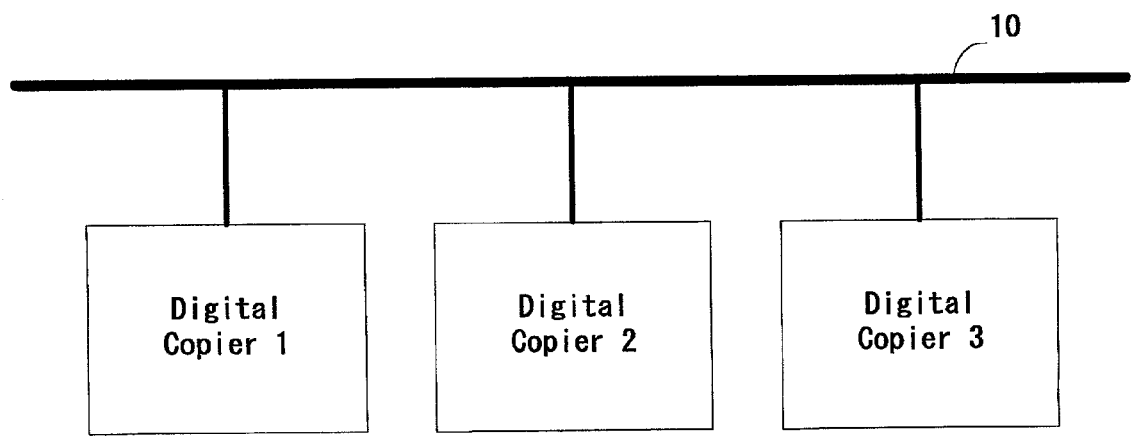
FIG. 1 is a structural block diagram of an embodiment of the image processing system.

The system of the present embodiment has the structure shown in FIG. 1. That is, the system of this embodiment is provided with a digital copier 1, digital copier 2, and digital copier 3. Each digital copier is connected to a network 10. The number of digital copiers may be two or more. In the present embodiment, allocation reading, described later, is possible.

Allocation reading is a function whereby a serial document set comprising a plurality of pages is allocated into a plurality of document sets having one or more pages, and the allocated document sets are respectively read by different reading devices (copiers), and thereafter the image data acquired by each reading device are integrated to obtain the image data of the serial document set. For example, when allocation reading a document set A of M pages (M being an integer either two or greater) by two reading devices, the document set is allocated into a document set 1 having N pages (M>N) and a document set 2 having M-N pages, and document set 1 is read by a reading device 1 (copier 1), and document set 2 is read by a reading device 2 (copier 2), and the respectively acquired image data are integrated to obtain the image data of the document set A. The number of allocations also may be three or more.

Figure 2:
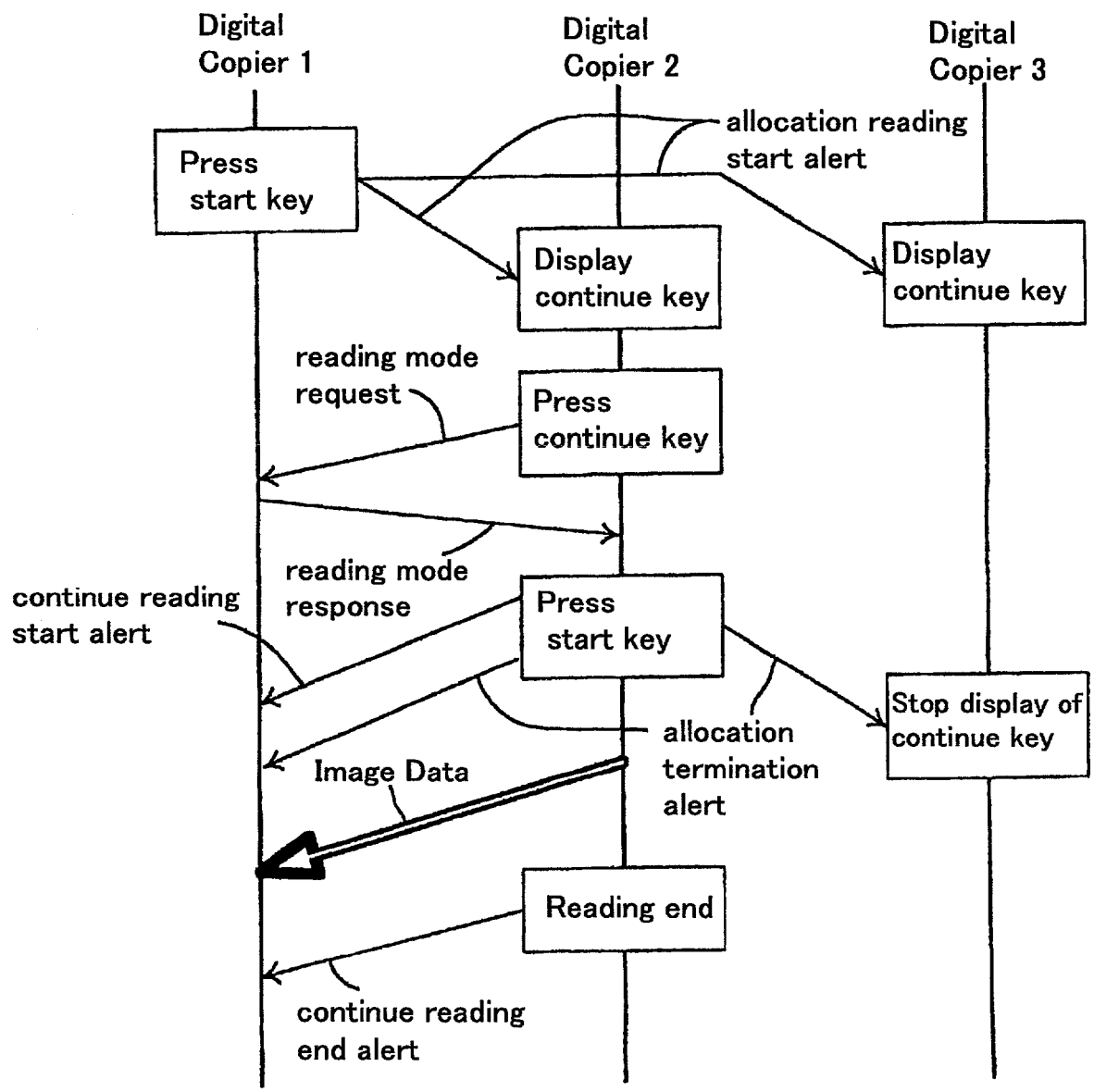
FIG. 2 is a sequence view of the processing executed by the image processing system.

The operation of each digital copier during allocation reading is described below based on the sequence diagram of FIG. 2. In the description below, document reading is accomplished by the digital copier 1 and the digital copier 2, and integration of the allocated image data is accomplished by the digital copier 1. First, part of the document set including the top page is placed in the digital copier 1, and the allocation reading mode is set. FIG. 3 shows an application setting screen on the operation panel 4 of a digital copier. In this screen, an [allocation reading] key is displayed. A user can set the allocation reading mode by selecting [allocation reading] in this screen. Next, when the allocation reading mode has been set, the start key 5 is pressed. The digital copier 1 starts reading the document when the start key 5 is pressed. In the following description, the digital copier performing the first operation of allocation reading is the allocation origin.

The allocation origin digital copier 1 sends an allocation reading start alert to the digital copier 2 and digital copier 3 simultaneously with the start of reading of the document. The allocation reading start alert is a signal for alerting other digital copiers that the allocation reading function has started in a specific digital copier. Having received the allocation reading start alerts, the digital copier 2 and digital copier 3 display a continue key 6 for inviting the continuation of document reading on their own operation panels 4 (FIG. 4). FIG. 4 is a basic setting screen on the operation panel 4. This screen displays the continue key 6 which is not normally displayed, in addition to the normal function keys such as the sort function, change magnification function and the like. A user can select the continue key 6 from the operation panel 4 to set continue reading of the remaining pages of the document as part of the allocation reading document set. The continue key 6 is pressed on the digital copier 2. Then, a reading mode request is transmitted from the digital copier 2 to the allocation origin digital copier 1. The reading mode request is a signal alerting the request origin as to whether or not the continue key 6 has been pressed, and requests the reading operation mode of the allocation origin digital copier 1. This reading operation mode is the setting of either color reading or monochrome reading, setting of one sided reading or duplex reading, setting of reading resolution, image reading density setting, white space setting and the like. The digital copier on which the continue key 6 has been pressed is referred to as the allocation destination in the following description.

The digital copier 2 may receive an allocation reading start alert from a plurality of allocation origins. In this case, which one of the jobs to continue is selected. FIG. 5 shows a job selection screen. A list of IDs of received allocation reading start alerts and the reception times is displayed on this screen. In this way a user selects his/her own allocation reading job. A password also may be provided for the selection of an allocation reading job to prevent operation by other users. Furthermore, when only a single allocation reading job is received, a password also may be requested when the continue key 6 of FIG. 4 is pressed.

The digital copier 1 (allocation origin) which received the reading mode request transmits a reading mode response to the digital copier 2 (allocation destination) which sent the reading mode request. This reading mode response is a signal for alerting as to whether or not the continue process is possible at the allocation origin, and alerting the allocation destination of the reading operation mode of the allocation reading job when the continue process is possible.

Figure 6:
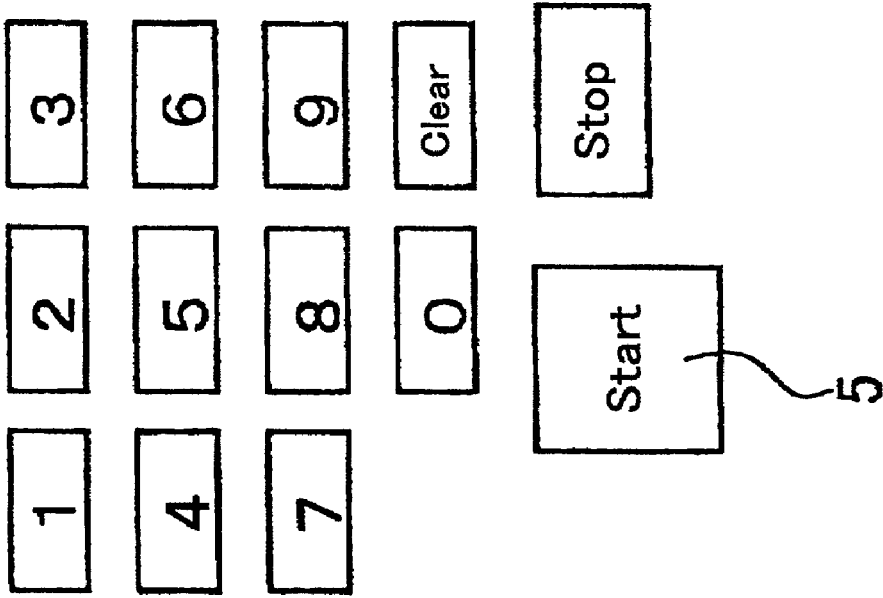
FIG. 6 shows an example of a screen for selecting the end part of a document in an image processing apparatus.

Then, the digital copier 2 which received the reading mode response displays a screen inviting reading to start. FIG. 6 shows the reading start standby screen. That is, a message inviting document preparation is displayed on the operation panel 4. Buttons are displayed for selecting whether or not the document is the allocation reading end part (i.e., the part including the last page of the document set).

After a user performs the operation for selecting whether or not this is the end part, when the start key is pressed, the digital copier 2 starts reading the document. When reading starts, the digital copier 2 transmits a continue reading start alert to the digital copier 1. The continue reading start alert is a signal alerting the allocation origin that reading of image data for integration has started. At this time, when the document end part has been selected, an allocation termination alert is transmitted to the digital copier 1 and the digital copier 3. The allocation termination alert is a signal to alert other copiers that further allocation is unnecessary. The display of the continue key 6 is stopped on the digital copier 3 which has received the allocation termination alert. Next, the digital copier 2 reads all the set pages of the document. Then, the document image data are transmitted to the allocation origin digital copier 1. Thereafter, when transmission of all image data ends, a continue reading end alert is transmitted to the digital copier 1. The continue reading end alert is a signal alerting the allocation origin that transmission of the allocated image data has ended.

Figure 7:
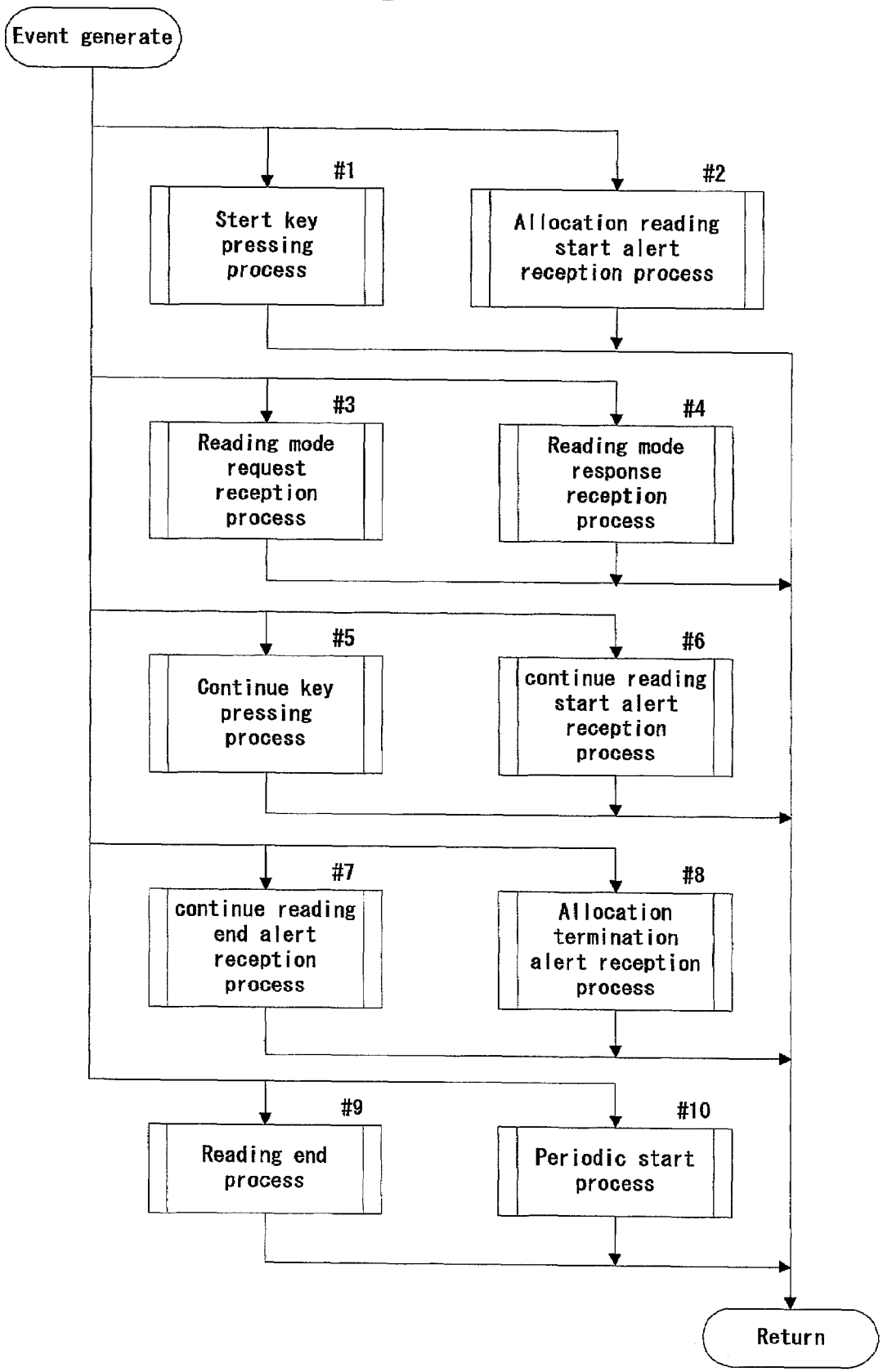
FIG. 7 is a flow chart of the process of event generation in an image processing apparatus.

The control of the processes in the digital copiers is described below based on the flow chart of FIG. 7. The digital copier of the present embodiment performs event drive control for executing each process corresponding to a generated event. Events relating to processes in the present embodiment are pressing the start key (#1), receiving an allocation reading start alert (#2), receiving a reading mode request (#3), receiving a reading mode response (#4), pressing the continue key (#5), receiving a continue reading start alert (#6), receiving a continue reading end alert (#7), receiving an allocation termination alert (#8), reading end (#9), and periodic start (#10).

A program corresponding to each event is executed for each event. Details of the processes of the programs are described below.

Figure 8:
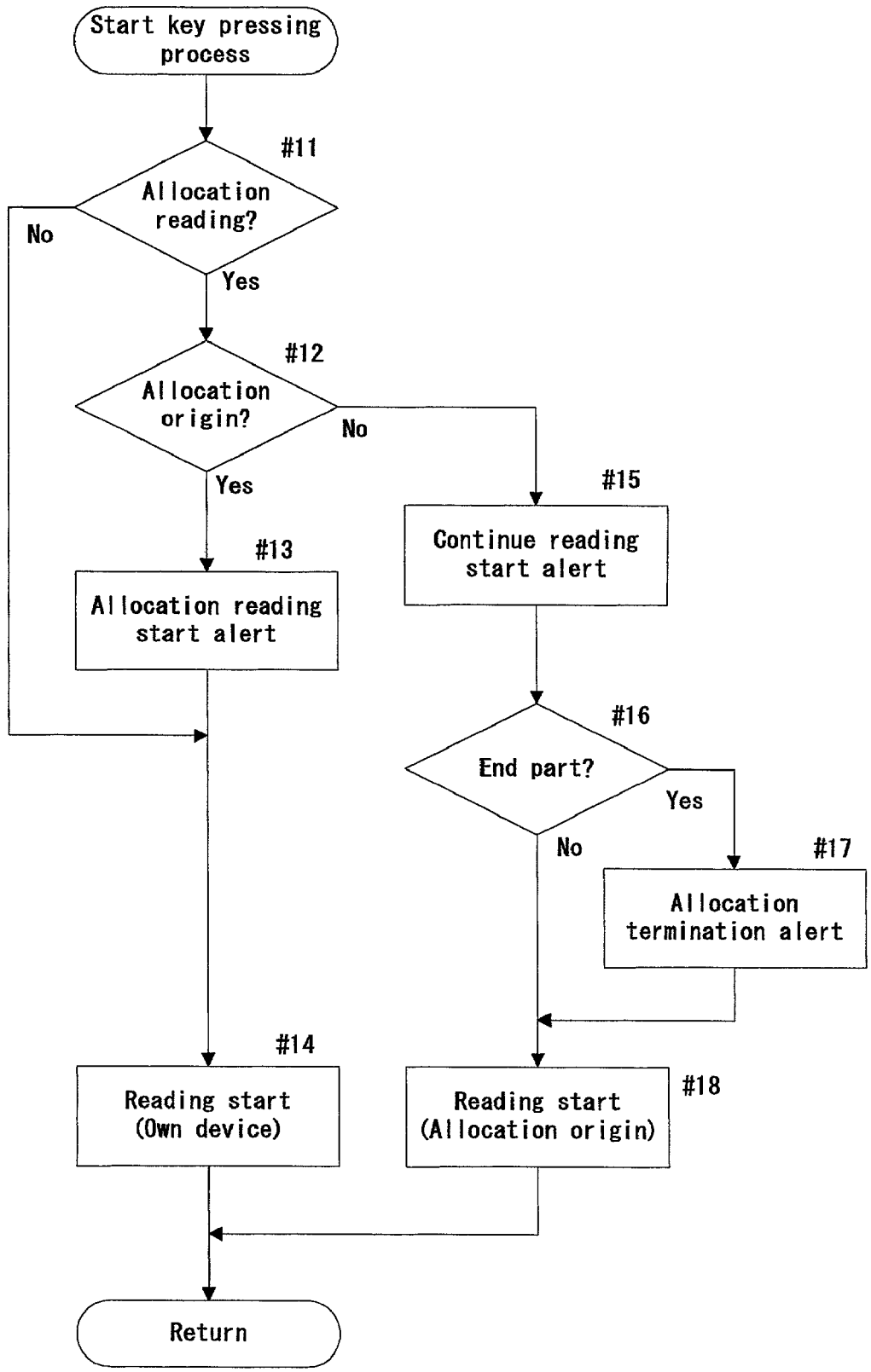
FIG. 8 is a flow chart is a flow chart showing the process of pressing the start key in an image processing apparatus.

First, the process of pressing the start key (#1; FIG. 7) is described based on the flow chart of FIG. 8. A determination is made as to whether or not the job is related to allocation reading (#11). When the job is not related to allocation reading (#11: NO), reading is started with the local image processing apparatus itself as the image data recording destination (#14). When the job is an allocation reading job (#11: YES), a determination is made as to whether or not the allocation origin is the own apparatus (device) itself (#12). When the own apparatus is the allocation origin (#12: YES), an allocation reading start alert is transmitted to all digital copiers connected to the network (#13). A password specification may be required of the user, and a specified password may be transmitted together with the allocation reading start alert. Then, reading is started with the own apparatus as the image data recording destination (#14).

When the own apparatus is not the allocation origin #12, i.e., when the own apparatus is the allocation destination (#12: NO), a continue reading start alert is transmitted to the allocation origin digital copier. Then, a determination is made as to whether or not the image data being read are the end part of a document (#16). This determination is accomplished by selecting either the [YES] button or the [NO] button to the message [Is this the document end part?] displayed on the screen of FIG. 6. When the image data are the document end part (#16: YES), an allocation termination alert is transmitted to all digital copiers connected to the network (#17). Then, reading is started with the image data recording destination as the allocation origin (#18). In this case, the read image data are transmitted to the allocation origin. When the image data are not the document end part (#16: NO), an allocation termination alert is not transmitted, and the process advances to #18. When steps #14~18 are executed, the processing initiated by pressing the start key ends.

Figure 9:
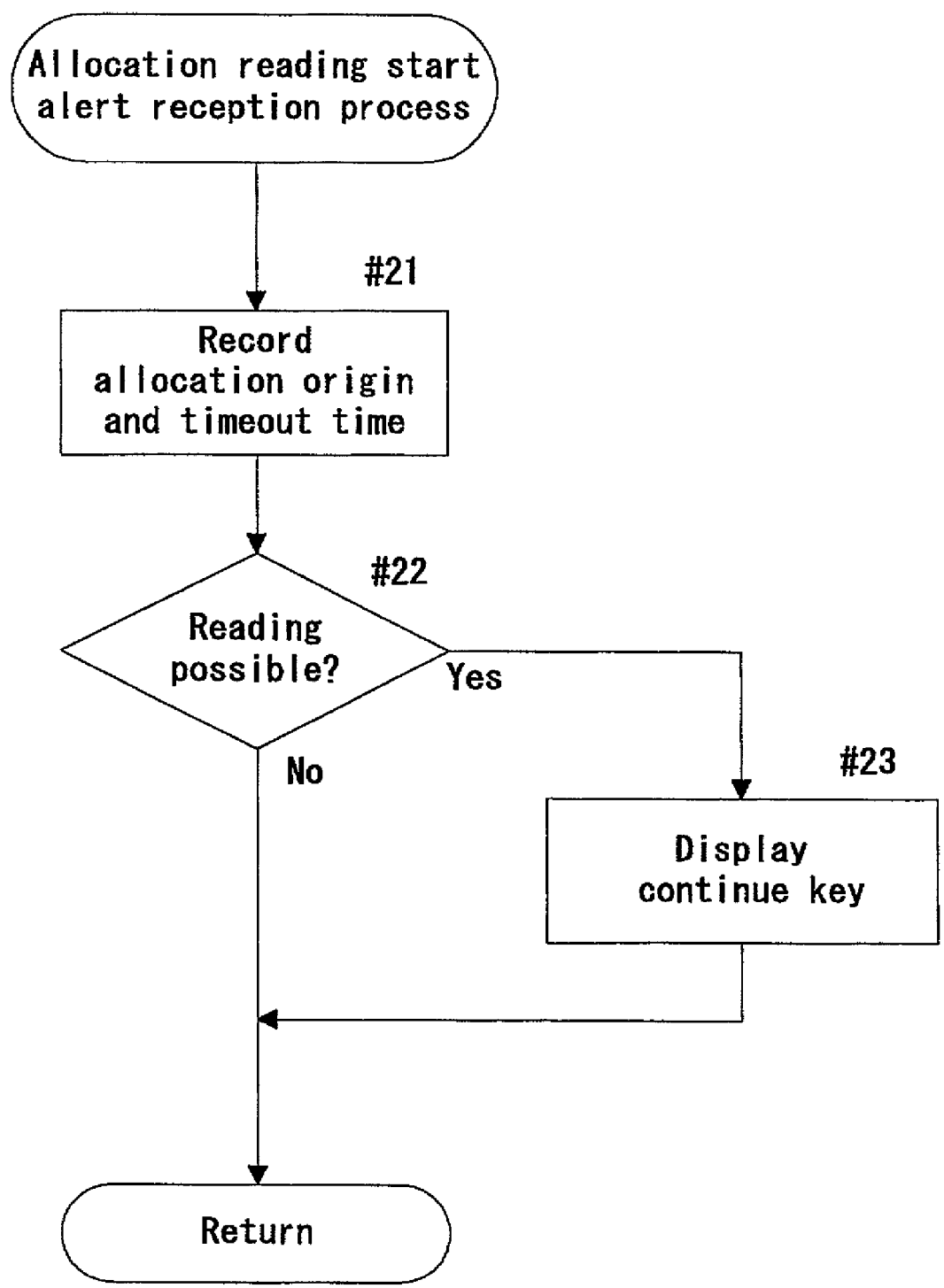
FIG. 9 is a flow chart showing the process of allocation reading start alert reception in an image processing apparatus.

The process of receiving an allocation reading start alert (#2; FIG. 7) is described below based on the flow chart of FIG. 9. First, the allocation origin digital copier and the allocation reading job timeout time are recorded (#21). The timeout time is the effective time permitting operation relating to the allocation reading after an allocation reading start alert has been received. The timeout time is normally set at a default value. However, a user also may set the timeout time at an optional value. Next, a determination is made as to whether or not reading is currently possible (#22). When reading is possible (#22: YES), the continue key 6 is displayed on the operation panel 4 (#23), and the allocation reading start alert reception process ends. When allocation reading is not possible (#22: NO), the allocation reading start alert reception process directly ends. The conditions wherein allocation reading is not possible include trouble conditions such as jams and insufficient function of the allocation destination digital copier and the like, and a busy condition at the allocation destination such as when a job is currently being read. When the device recovers from a busy condition prior to the timeout, and when an allocation termination alert has not been received, the continue key 6 is displayed.

Figure 10:
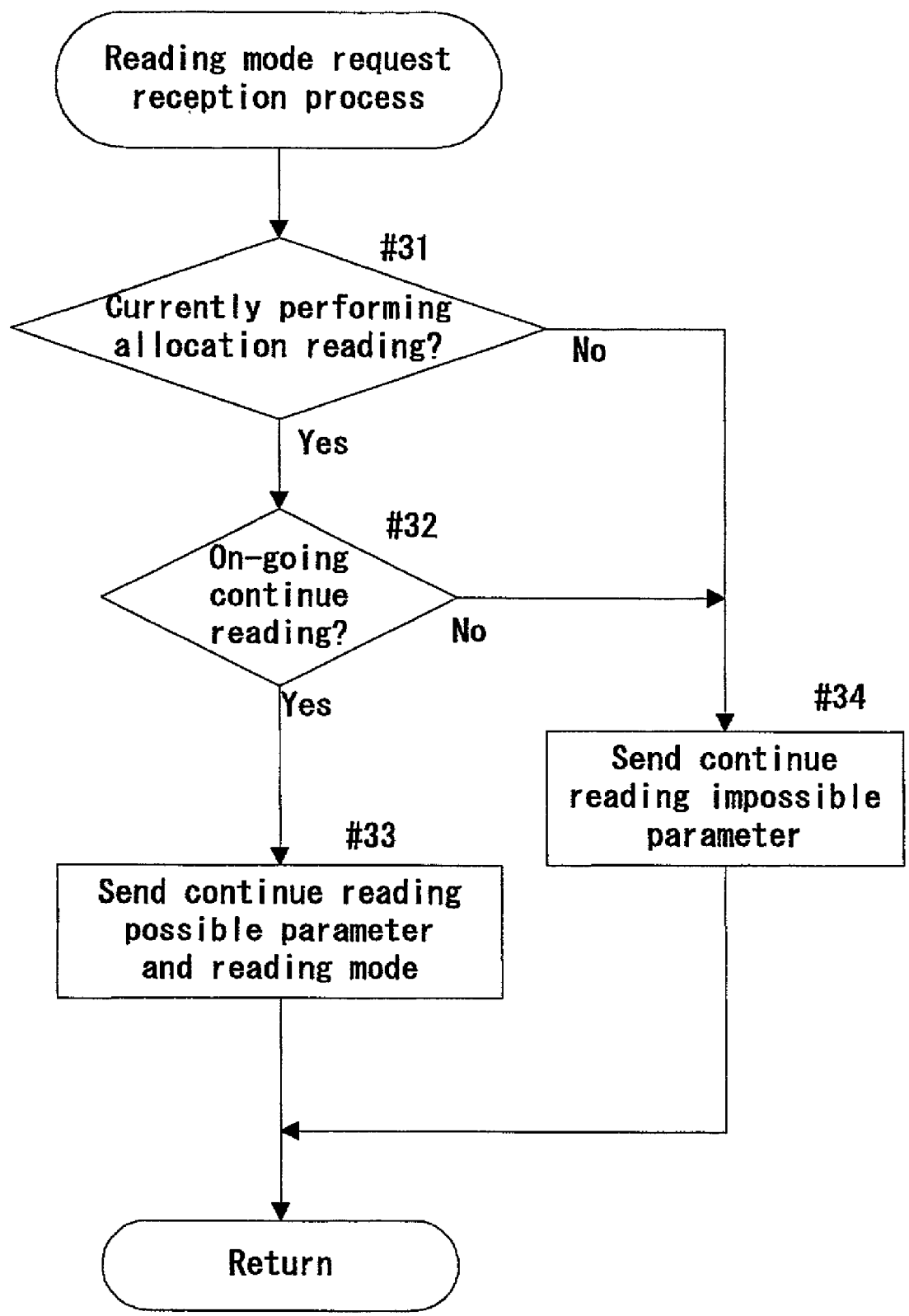
FIG. 10 is a flow chart showing the process of the read mode request reception in an image processing apparatus.

The process of the reading mode request process (#3; FIG. 7) is described below based on the flow chart of FIG. 10. First, a determination is made as to whether or not the own apparatus is currently performing allocation reading (#31). When the own apparatus is currently performing allocation reading (#31: YES), a further determination is made as to whether or not continue reading is currently on-going (#32). When continue reading is current on-going, i.e., when an allocation termination alert has not been received (#32: YES), a read mode response specifying the continue reading possible parameter and operation mode setting data are transmitted to the allocation destination (#33). This is the reading mode response transmission. When the own apparatus is not currently performing an allocation reading (#31: NO), or when continue reading is not currently being performed and an allocation termination alert has not been received (#32: NO), a reading mode response specifying the continue reading impossible parameter is transmitted to the allocation destination (#34). When step #22 or #23 is executed, the reading mode request reception process ends.

Figure 11:
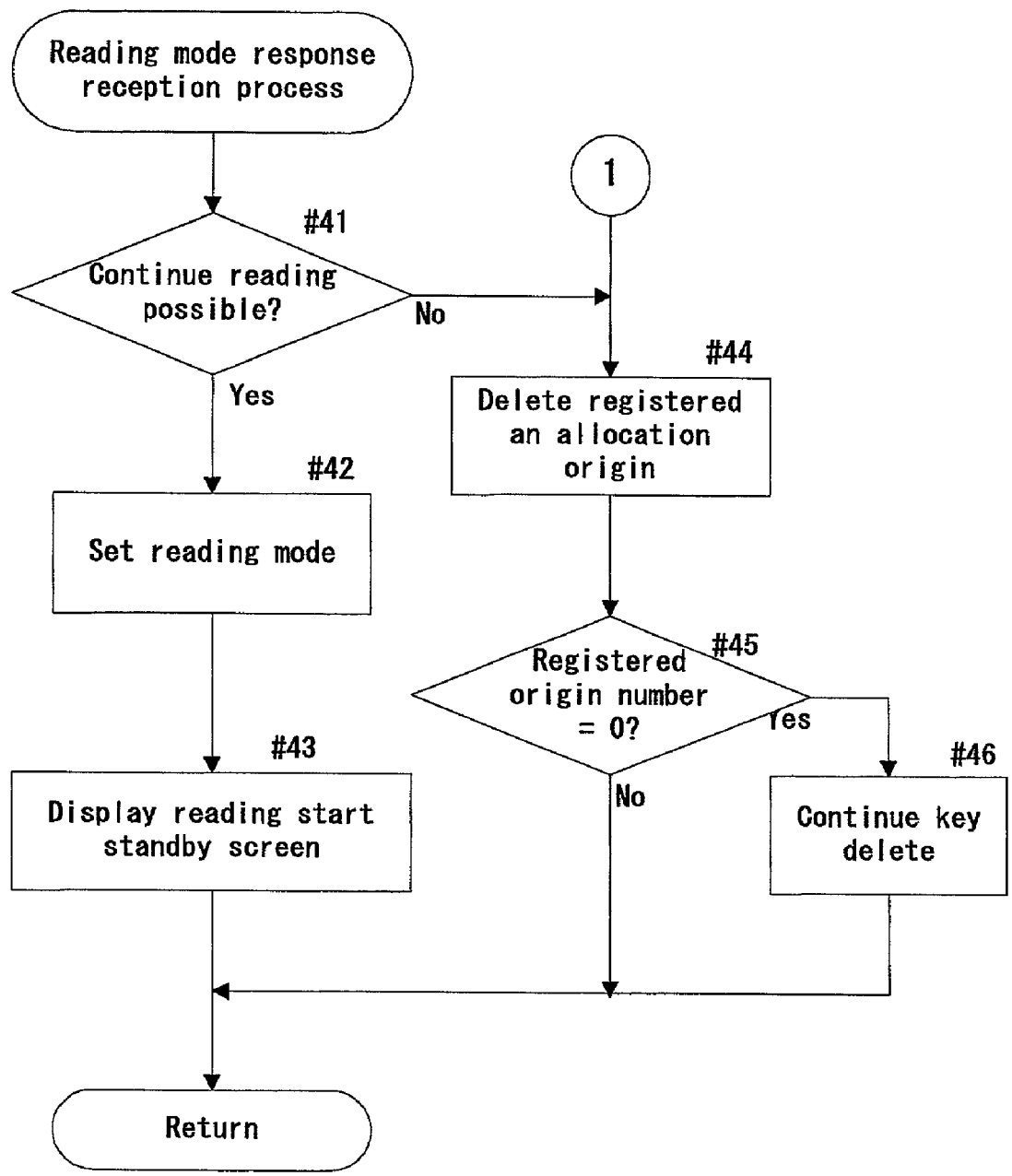
FIG. 11 is a flow chart showing the process of the read mode response reception in an image processing apparatus.

The reading mode response reception (#4; FIG. 7) process is described below based on the flow chart of FIG. 11. First, a determination is made as to whether or not the continue reading is possible parameter is attached to the received reading mode response (#41). When the parameter is that continue reading is possible (#41: YES), the received operation mode is set as the operation mode of the device (#42). The reading start standby screen shown in FIG. 6 is displayed (#43). When the parameter is continue reading is not possible in #41 (#41: NO), the registration of the allocation origin recorded in the own apparatus is deleted (#44). Then, after deletion, a determination is made as to whether or not an allocation origin is still registered in the own apparatus (#45). When no allocation origin is registered (#45: YES), the continue key 6 of FIG. 4 displayed on the screen is deleted (#46). When an allocation origin is registered (#45: NO), the reading mode response reception process directly ends. When step #43 or #46 is executed, the reading mode response reception process ends.

Figure 12:
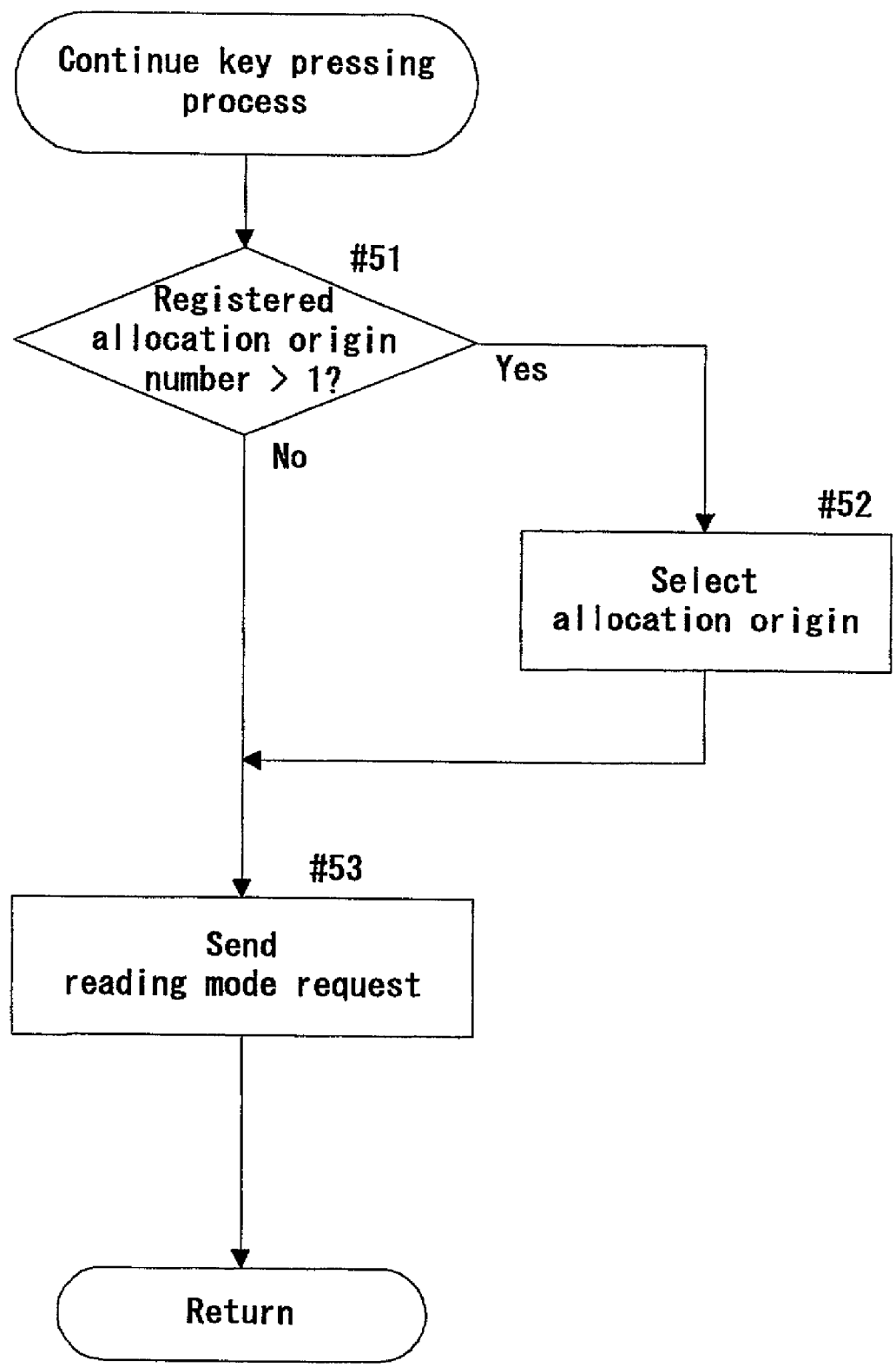
FIG. 12 is a flow chart showing the process of pressing the continue key in an image processing apparatus.

The process of pressing the continue key (#5: FIG. 7) is described below based on the flow chart of FIG. 12. First, a determination is made as to whether or not a plurality of allocation origins are registered (#51). When a plurality of allocation origins are registered (#51: YES), the job selection screen of FIG. 5 is displayed, and user selection of an allocation origin is awaited (#52). When a user selects an allocation origin, a reading mode request is transmitted to this allocation origin (#53). When only a single allocation origin is registered (#51: NO), the job selection screen is not displayed since the allocation origin is already determined, and a reading mode request is transmitted to the allocation origin (#53). When the process of #53 is executed, the process of pressing the continue key ends. Password input also may be required prior to step #53. In this case, the process of #53 is executed upon condition that a correct password has been input.

Figure 13:
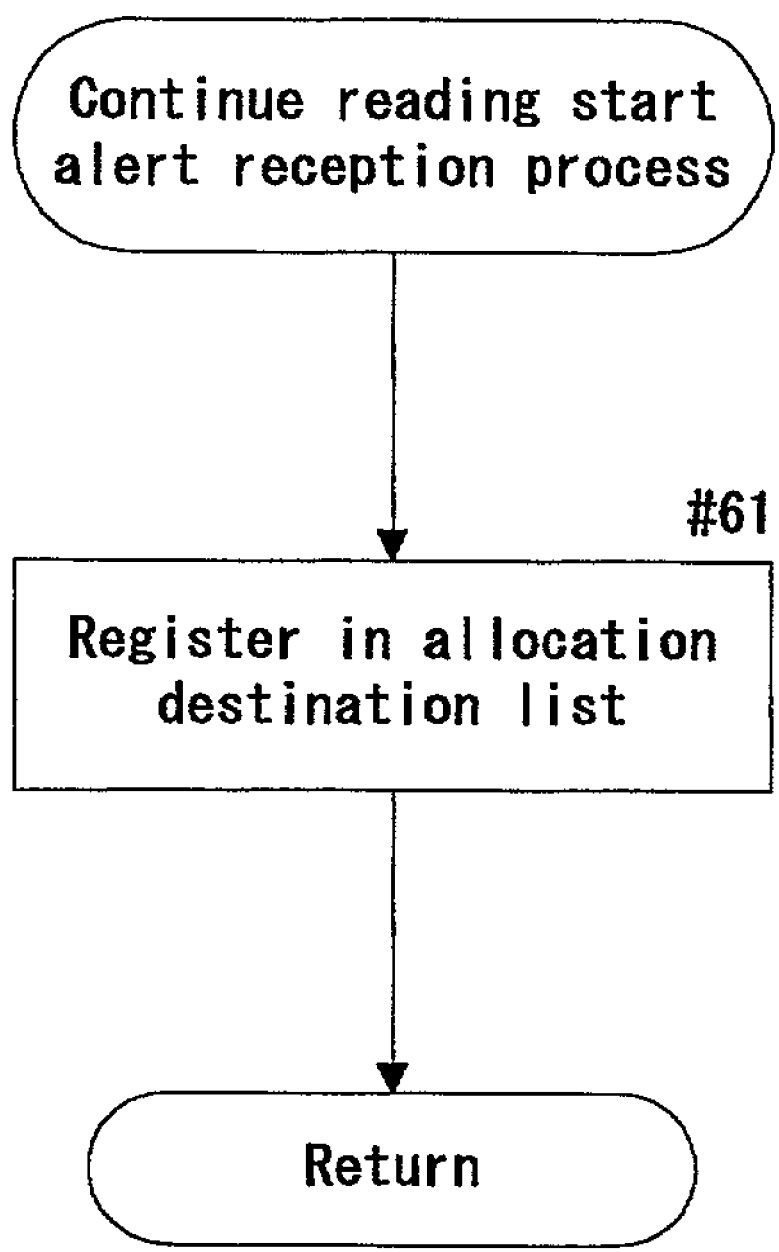
FIG. 13 is a flow chart of the process of continue reading start alert reception in an image processing apparatus.

The process of the continue reading start alert reception is described below based on the flow chart of FIG. 13. First, the allocation destination digital copier receiving the continue reading start alert is registered in the allocation destination list (#61). The allocation destination list records the digital copiers executing the remaining parts of the allocation reading of the document set. When #61 is executed, the continue reading start alert reception process ends.

Figure 14:
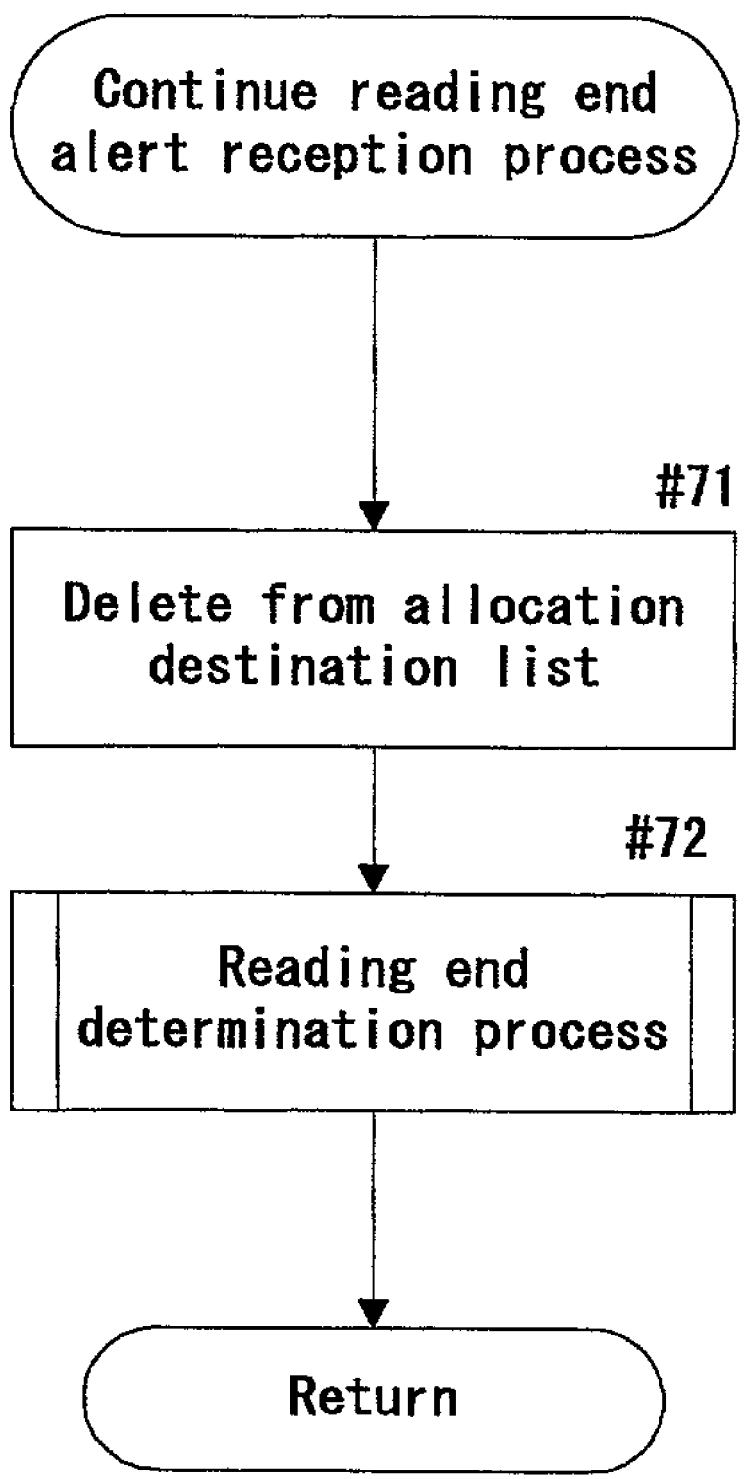
FIG. 14 is a flow chart showing the process of continue reading end alert reception in an image processing apparatus.

The process of the continue reading end alert reception (#7: FIG. 7) is described below based on the flow chart of FIG. 14. First, the allocation destination digital copier which sent the continue reading end alert is deleted from the allocation destination list of the own apparatus (#71). Then, a reading end determination process described later is executed for post processing of the read image data (#72). When #72 is executed, the continue reading end alert reception process ends.

Figure 15:
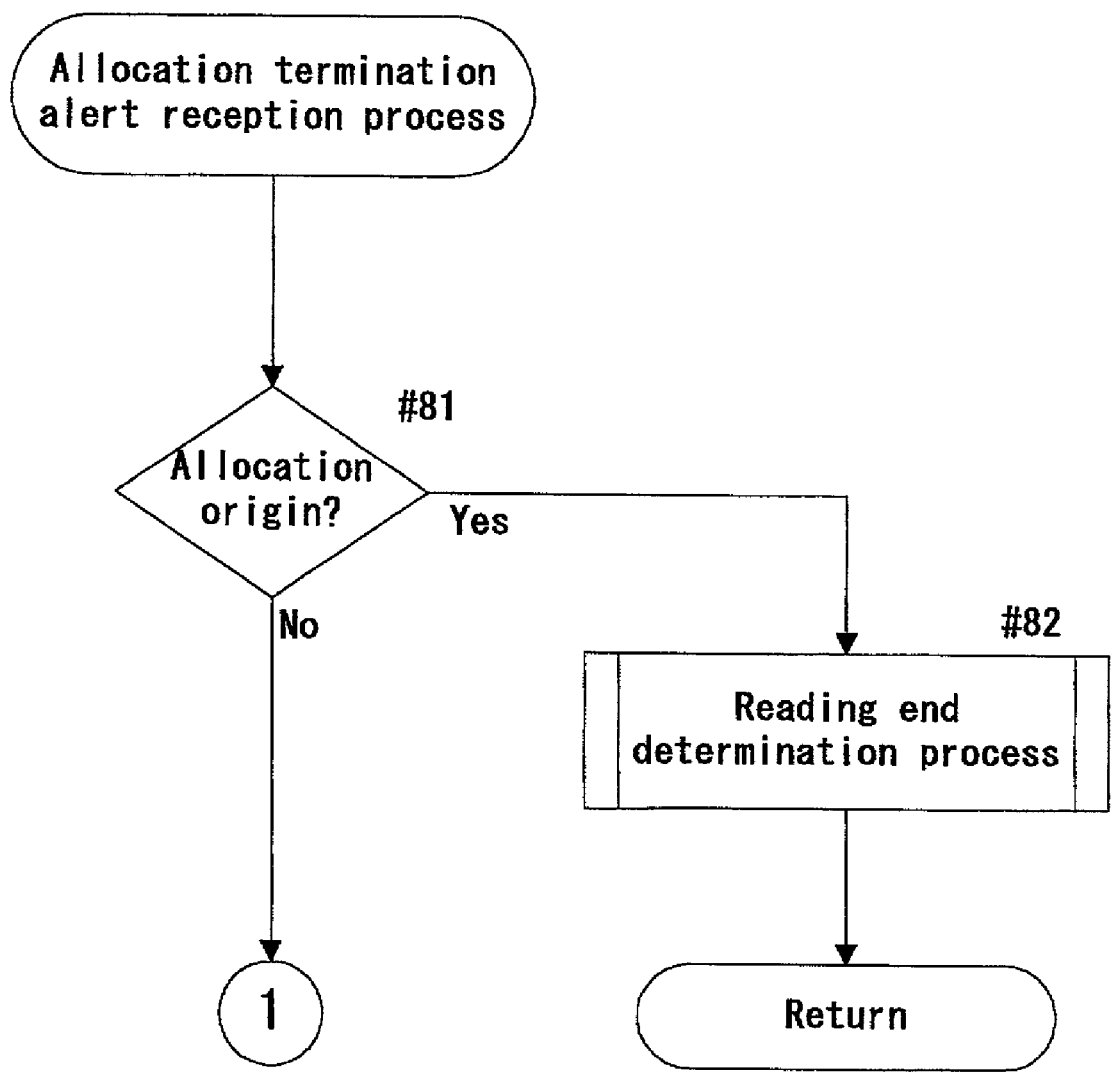
FIG. 15 is a flow chart showing the process of allocation reading termination alert reception in an image processing apparatus.

The allocation termination alert reception process (#8; FIG. 7) is described below based on the flow chart of FIG. 15. First, a determination is made as to whether or not the own apparatus is the allocation origin (#81). When the own apparatus is the allocation origin (#81: YES), a reading end determination process described later is executed for post processing of the read image data (#82). When the own apparatus is not the allocation origin (#81: NO), the process continues to #44 in FIG. 11, and the previously described deletion of the allocation origin register is executed. Then, the allocation termination alert reception process ends.

Figure 16:
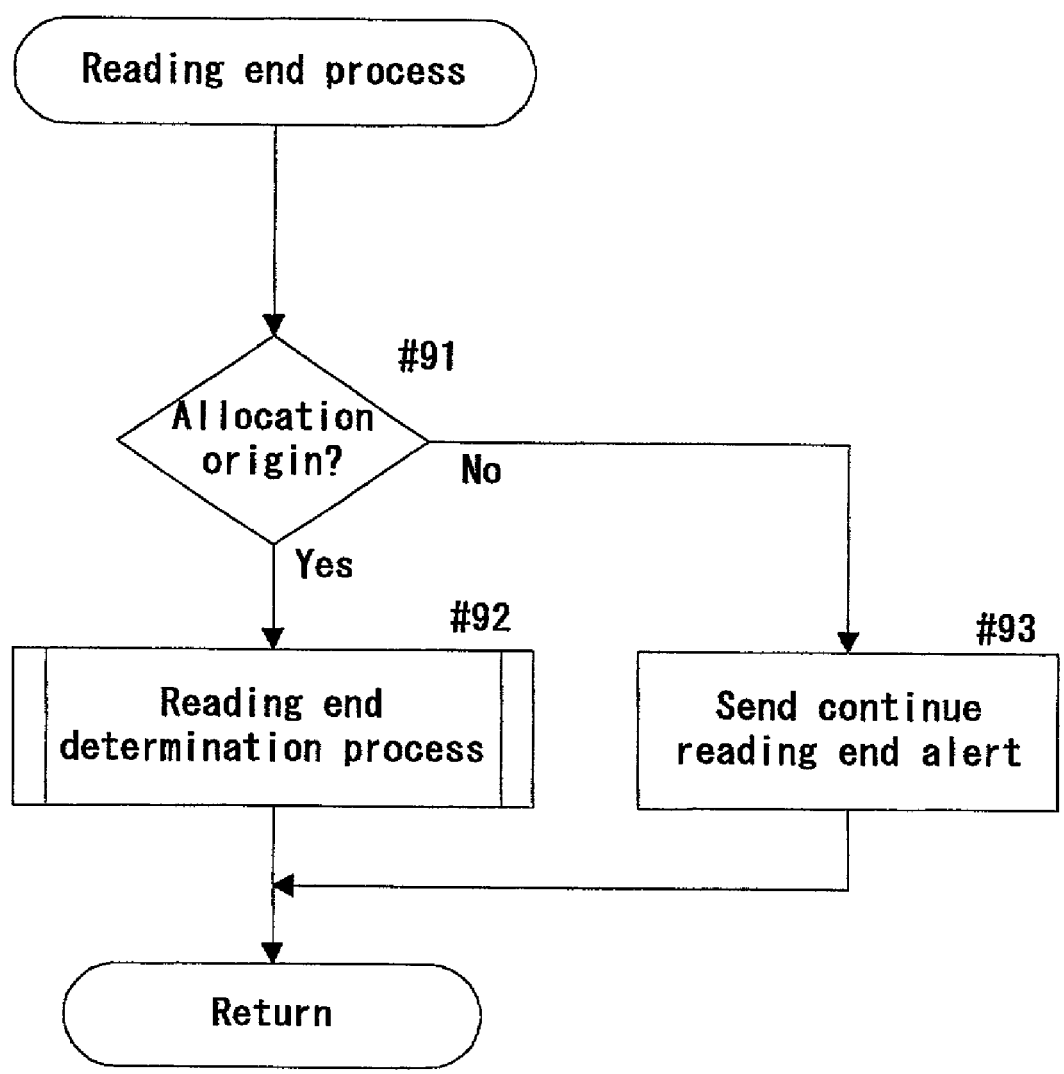
FIG. 16 is a flow chart showing the process of reading end in an image processing apparatus.

The end of the reading process (#9; FIG. 7) is described below based on the flow chart of FIG. 16. First, a determination is made as to whether or not the own apparatus is the allocation origin (#91). When the own apparatus is the allocation origin (#91: YES), a reading end determination process described later is executed for post processing of the read image data (#92). When the own apparatus is not the allocation origin (#91: NO), a continue reading end alert is transmitted to the allocation origin (#93). When #92 or #93 is executed, the reading end process ends. When reading is normal reading and not allocation reading in #91, the determination is YES.

Figure 17:
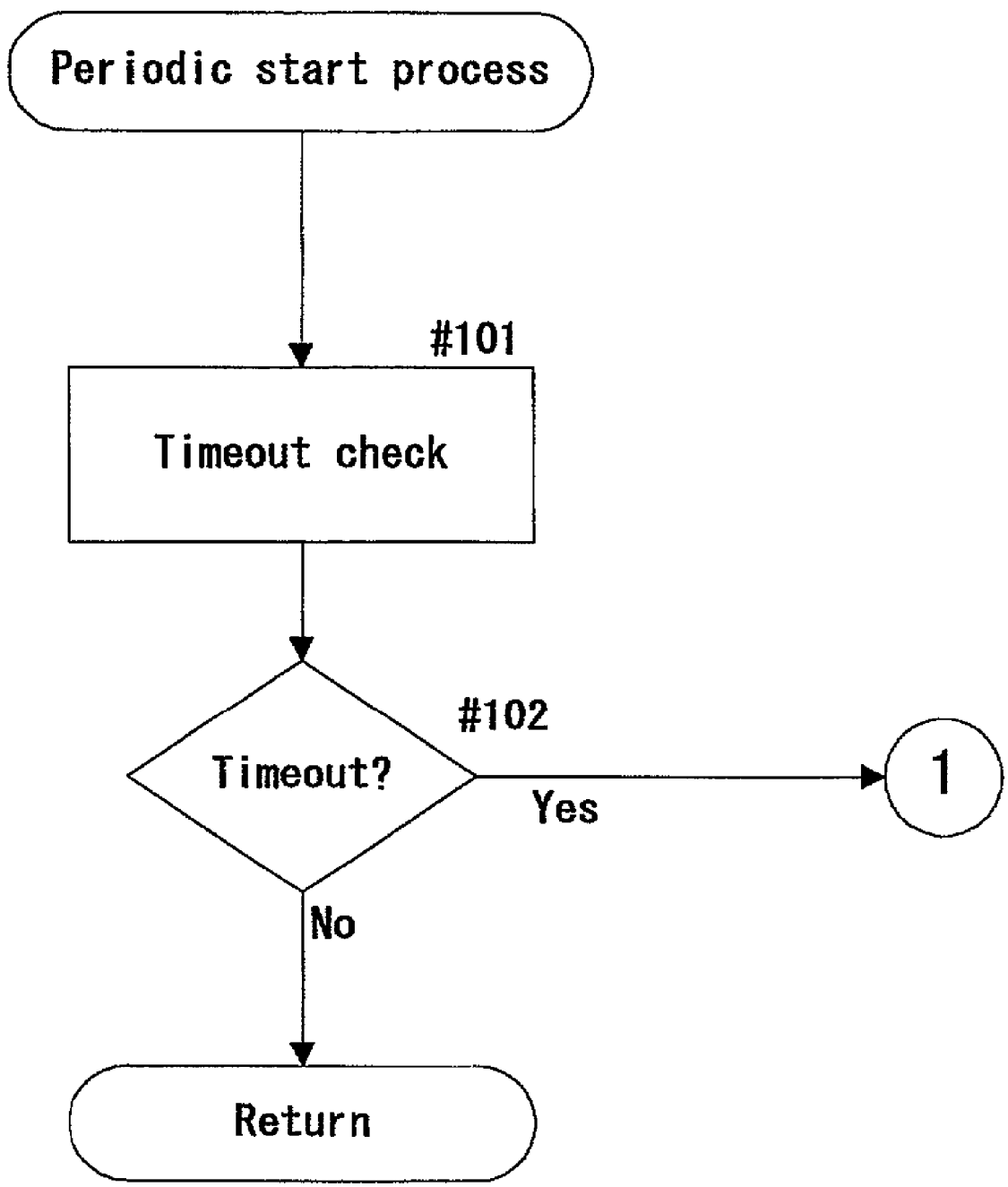
FIG. 17 is a flow chart showing the process of periodic starting in an image processing apparatus.

The periodic start process (#10; FIG. 7) is described below based on the flow chart of FIG. 17. The periodic start is a timer event generated at a fixed interval after the digital copier is started, or after the allocation origin digital copier is first registered. First, a timeout check is performed on the all registered allocation origins (#101). Then, a determination is made as to whether or not an allocation origin has timed out (#102). When no allocation origin has timed out (#102: NO), the periodic start process directly ends. When an allocation origin has timed out (#102: YES), the process continues to #44 of FIG. 11, and the previously described registration of the timed out allocation origin is deleted. Then, the periodic start process ends.

Figure 18:
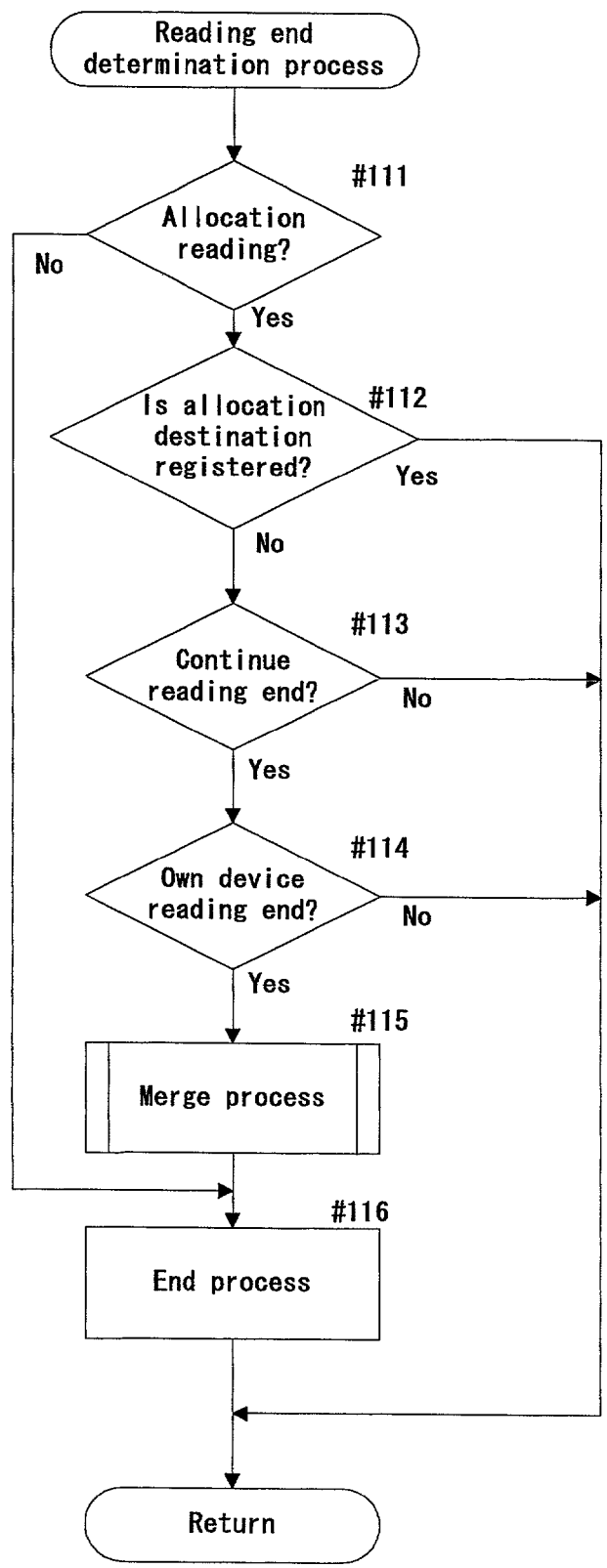
FIG. 18 is a flow chart showing the process of reading end determination in an image processing apparatus.

The reading end determination process is described below based on the flow chart of FIG. 18. The reading end determination process is executed in #72 of FIG. 14, #82 of FIG. 15, #92 of FIG. 16. First, a determination is made as to whether or not a job is an allocation reading job (#111). If the job is not an allocation reading job, i.e., if the job is a normal job (#111: NO), the process ends (#116), and thereafter the reading end determination process ends. When the job is an allocation reading job (#111: YES), a determination is made as to whether or not the job is registered on the allocation destination list (#112). When the job is registered (#112: YES), the reading end determination process directly ends. The reading end determination process ends because reading at the allocation destination is not yet completed. When the job is not registered (#112: NO), a determination is made as to whether or not a continue reading end alert has been received (#113). When such an alert has not been received #113: NO), the reading end determination process directly ends. When such an alert has been received #113: YES), the own apparatus determines whether or not reading has ended (#114). When reading has not ended (#114: NO), the reading end determination process directly ends. When reading has ended (#114: YES), all reading related to the allocation is completed. Therefore, the merge process for the acquired image data is executed (#115). Thereafter, the end process (#116) is executed, and the reading end determination process ends.

The image data merge process is described below. This process is described in the flow chart of FIG. 19. The data structure relating to the management of allocation jobs is described via FIG. 20 prior to the description of FIG. 19.

Figure 20:
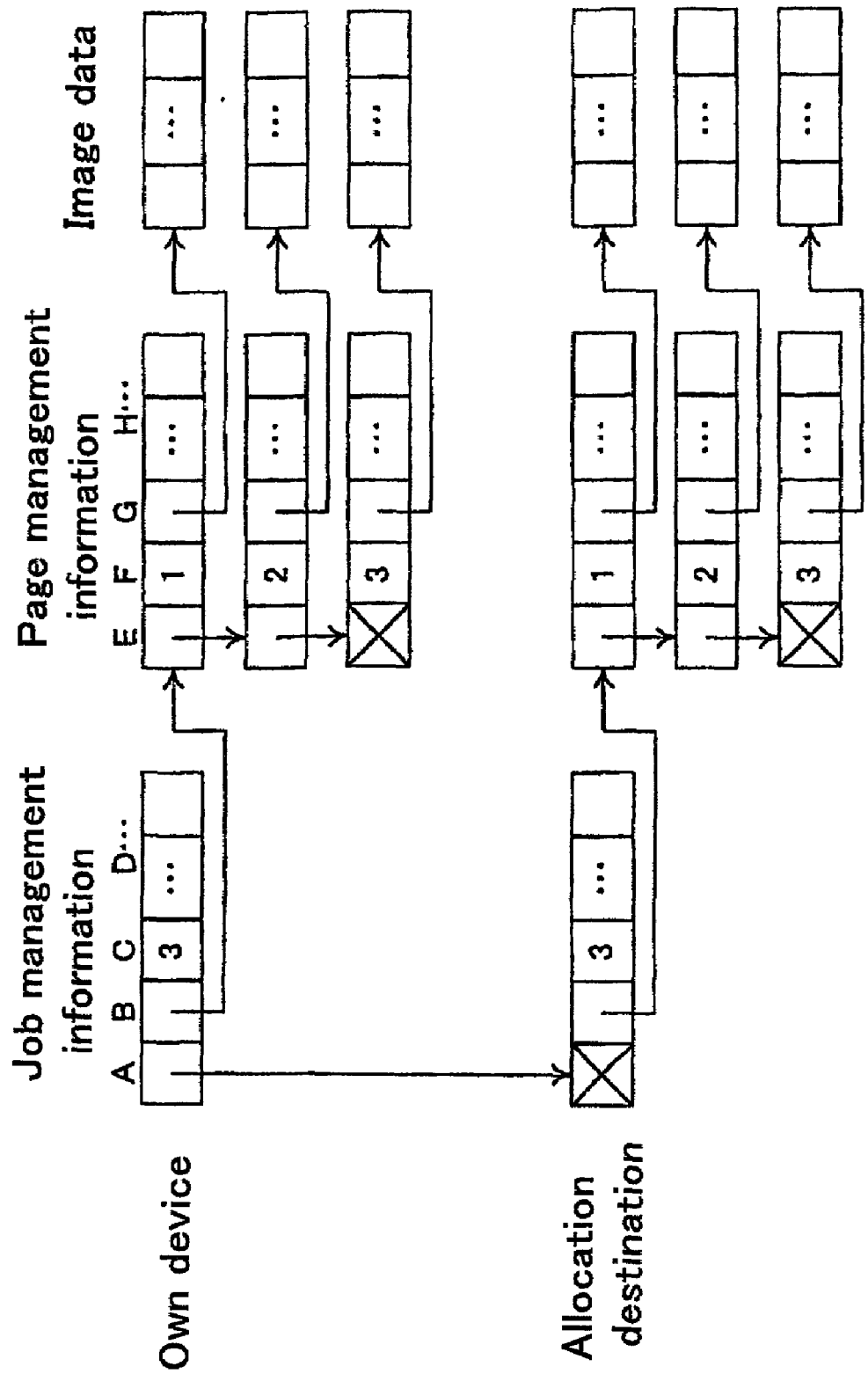
FIG. 20 is an example of a data structure diagram showing the content structure prior to the merge process of job management information.

FIG. 20 shows a data structure at the point in time at which three pages of a document have been read one page at a time respectively by the allocation origin and allocation destination. All the data shown are generated within the allocation origin digital copier. Job management information are generated only for the number of document allocations. In the example of FIG. 20, job management information are generated for the allocation origin own apparatus and the allocation destination. Line A in the job management information represents link relationships to continuation job management information. Line B represents the link relationship to job management information within a job. Line C represents the number of pages of a job. In the example of job management information of the own apparatus in FIG. 20, job management information of the allocation destination is represented in line A. Page number 3 at the current time is represented in line C.

The job management information are generated only for the number of pages of each read image information. In the example of FIG. 20, page management information for three pages is generated for the own apparatus, and page management information for three pages is generated for the allocation destination. Line E in the page management information represents the link relationship to the next page management information. Line F represents the page number. Line G represents the link relationship to the image data. In the example of the job management information of the first page of the own apparatus in FIG. 20, the next job management information is shown in line E. Line F represents the page number. Line G shows the link to the image data of this page. The image data are electronic data of the document. Although normally compressed and stored in memory, uncompressed image data also may be stored in memory.

Figure 19:
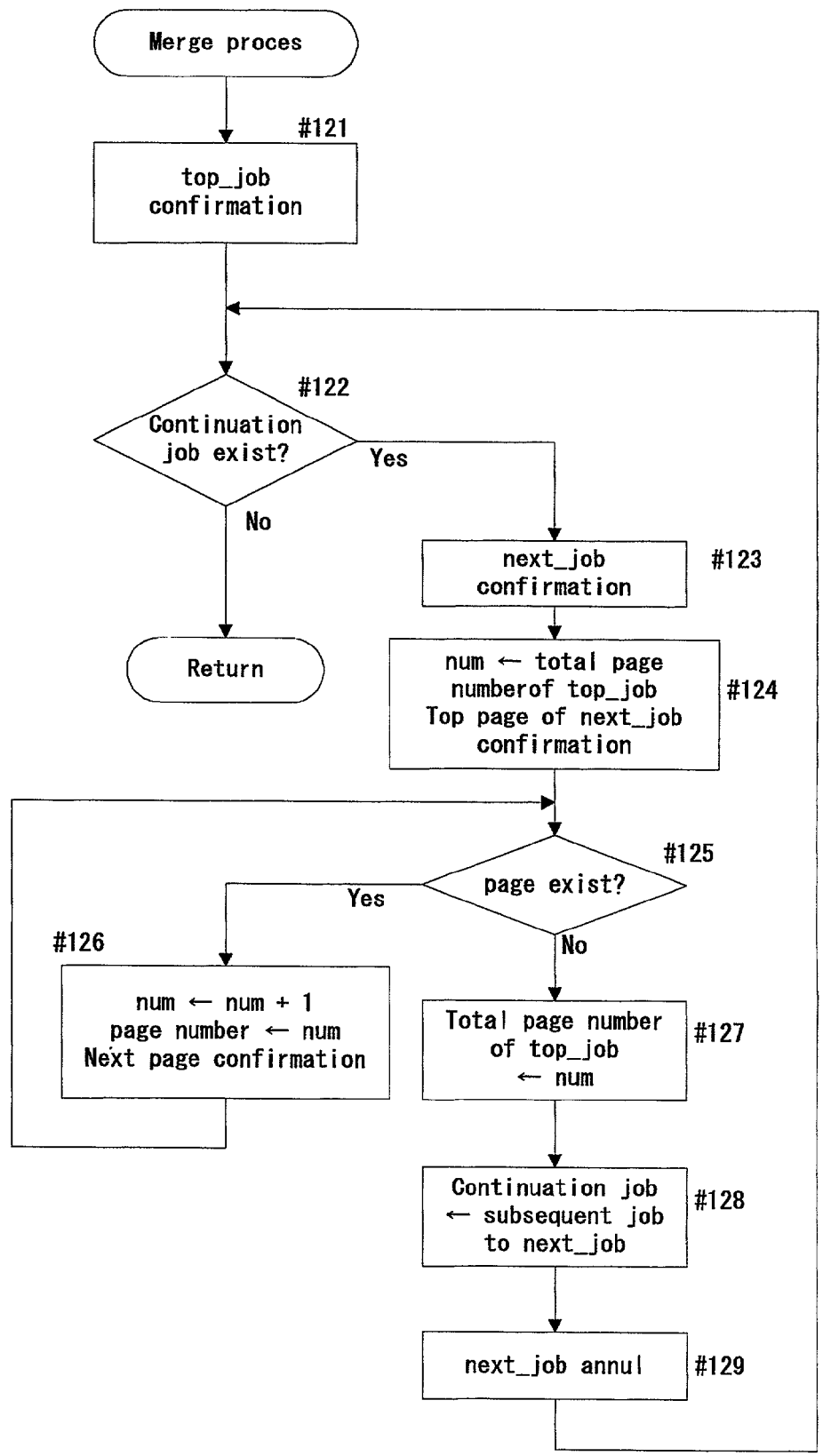
FIG. 19 is a flow chart showing the merge process in an image processing apparatus.

The process shown in FIG. 19 is executed after reading is completely ended as previously described. The boxes [top_job] and [next_job] in the flow chart of FIG. 19 are codes for confirming job management information of the digital copier. The box [num] is a numeric value representing the page number or number of pages. First, job management information registered at the top is confirmed as the top_job (#121). In the example of FIG. 20, the job management information of the own apparatus is confirmed. Next, a determination is made as to whether or not the next recorded job management information is a continuation of the top_job (#122). In the example in FIG. 20, the continuation job management information is job management information of the allocation destination, and the presence of the job management information is confirmed. When continuation job management information does not exist (#122: NO), the merge process directly ends.

When job management information exists (#122: YES), the job of the continuation of the top_job is confirmed as the next job (#123). In the example of FIG. 20, allocation destination job management information becomes the next_job. Next, the total number of pages of the top_job is designated the num, and the top page of the next_job is confirmed (#124). Next, a determination is made as to whether or not this page exists (#125). When this page exists (#125: YES), [1] is added to num, and the page number of this page is designated num. In this way, the top page of the next_job is added to the end of the top_job. Then, the page of the confirmation target moves to the next page (#126). When the process of #126 is executed, the process moves to #125. That is, the processes of #125~#126 are repeated until all pages of the next_job are moved to the top_job. When there are no pages left of the next_job (#125: NO), the current num value becomes the total number of pages of the top_job (#127). Thereafter, a subsequent job which is now the next_job is designated a job continuation of the top_job (#128). Finally, the registration of the current next_job is annulled (#129), and the process returns to #122. That is, the processes of #122~#129 are repeated until all registered jobs are merged. Then, the merge process described above ends.

Figure 21:
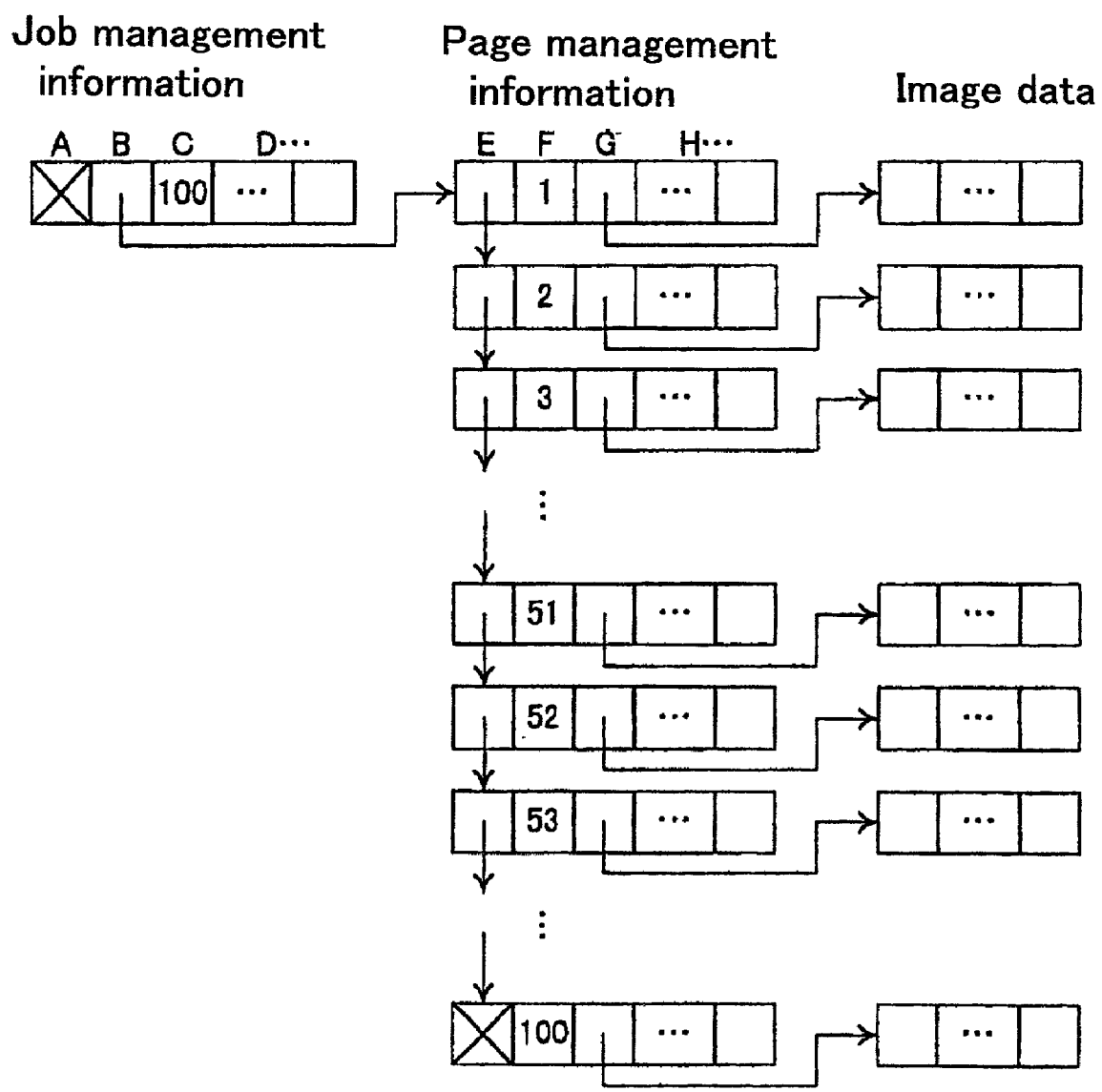
FIG. 21 is an example of a data structure diagram showing the content structure after the merge process of job management information.

FIG. 21 shows data structure of the job management information after the merge process of a specific document having a total of 100 pages. Before the merge process (FIG. 20), a page number (line F) is allotted to each allocation job. However, after the merge process, page numbers are allotted consecutively as a single job management information.

As described in detail above, in the present embodiment, allocation reading is started by transmitting an allocation reading start alert from the allocation origin digital copier 1. In the digital copier 2 which received the allocation reading start alert, a continue key 6 is displayed on the operation panel 4 for user specification to continue reading by the allocation reading function. When a user presses the continue key 6, the operation mode is transmitted from the allocation origin digital copier 1, and the document image is read using this operation mode in the allocation destination digital copier 2. Then, the image data are transmitted to the allocation origin digital copier 1. Finally, in the allocation origin digital copier 1, the received image data are integrated with the image data read by the own apparatus, and all the integrated image data are managed as an integrated set. In this way, a digital copier and system are realized which is capable of simply executing allocation reading simply by an operation pursuant with the display on the operation panel 4.

When allocation reading ends, an allocation termination alert is transmitted to the other digital copier, and the digital copier receiving this alert automatically erases the display of the continue key 6. Furthermore, the display of the continue key 6 is similarly erased even when an operation related to fixed time allocation reading is over without receiving an allocation termination alert. In this way the operation mode on the user is reduced and erroneous operation is prevented.

The present embodiment has been described by way of simple examples which in no way limits the present invention. Accordingly, the present invention may be variously improved and modified insofar as such improvement and modification do not essentially depart from the scope of the invention. For example, although digital copiers are used as the image processing apparatuses in the present embodiment, similar effect can be realized using scanners, facsimile machines and the like. Furthermore, a system may be realized which uses a mixture of these image processing apparatuses.

As can be clearly understood from the above description, the present invention provides an image processing apparatus and image processing system capable of allocation reading of a document via a simple operation to acquire integrated image data.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image processing apparatus capable of communicating with another image processing apparatus, the image processing apparatus comprising:
   an image reading unit for reading an image of a document to acquire image data;
   a setting unit for setting an allocation reading function for integrating first image data acquired by reading a first document set by the image reading unit and second image data acquired by reading a second document set by said other image processing apparatus to generate integrated image data of the document sets; and a first transmission controller for transmitting a signal to the other image processing apparatus to provide the other image processing apparatus with an operation device regarding the allocation reading function, wherein said operation device provided on the other image processing apparatus by the signal from the first transmission controller is an operation device for a user to initiate the reading of said second document set in the allocation reading function.

2. An image processing apparatus as claimed in claim 1, further comprising:

a reception controller for receiving second image data acquired by reading a second document set by said other image processing apparatus; and an image data integration controller for integrating the received second image data with the first image data.

3. An image processing apparatus as claimed in claim 1, further comprising:

a second transmission controller for transmitting a reading mode relating to the allocation reading to said other image processing apparatus.

4. An image processing apparatus as claimed in claim 3, wherein said second transmission controller transmits a reading mode relating to the allocation reading only when a reading mode request has been received from said other image processing apparatus.

5. An image processing apparatus as claimed in claim 1, wherein said first transmission controller transmits the signal to provide the operation device for the allocation reading to said other image processing apparatus in response to the start of reading of the first document set by the image reading unit.

6. An image processing apparatus as claimed in claim 1, wherein said operation device is provided on a display on an operation panel of the other image processing apparatus.

7. An image processing apparatus capable of communicating with another image processing apparatus, the image processing apparatus comprising:

an image reading unit for reading the image of a document to acquire image data;

a display controller for displaying an operation key for a user specification relating to an allocation reading function on its own display unit in response to receiving a signal from said other image processing apparatus, the allocation reading function being a function for integrating first image data acquired by reading a first document set by said other image processing apparatus and second image data acquired by reading a second document set by the image reading unit to generate integrated image data of the document sets;

a reading controller for executing, upon actuation of the displayed operation key by a user, reading of the second document set by the image reading unit; and a first transmission controller for transmitting the second image data acquired by reading the second document set to said other image processing apparatus.

8. An image processing apparatus as claimed in claim 7, further comprising a second transmission controller for sending a reading mode request to request said other image processing apparatus to transmit a reading mode regarding the allocation reading in response to the operation of the operation key, wherein said reading controller executes reading of the second document set in accordance with the reading mode received from said other image processing apparatus.

9. An image processing apparatus as claimed in claim 7, further comprising:

a first selector for a user to select whether or not to terminate the allocation reading; and a second transmission controller for sending a signal back to invalidate the operation key for user specification of the allocation reading function when allocation reading termination is selected.

10. An image processing apparatus as claimed in claim 7, wherein said display controller invalidates the operation key for user specification relating to the allocation reading function via a signal from said other image processing apparatus.

11. An image processing apparatus as claimed in claim 7, wherein said display controller invalidates the operation key when a specific time has elapsed after the operation key for user specification relating to the allocation reading function has been displayed.

12. An image processing apparatus as claimed in claim 7, further comprising:

a second selector for a user to select which image processing apparatus is set for the allocation reading when signals relating to allocation reading are received from two or more other image processing apparatuses.

13. An image processing apparatus as claimed in claim 7, wherein said display controller displays the operation key for user specification related to the allocation reading function after entering a standby state where the image processing apparatuses itself is not in a standby state when a signal relating to the allocation reading function is received.

14. An image processing apparatus as claimed in claim 7, wherein its own display unit is the display unit on the operation panel of the image processing apparatus.

15. An image processing system including first and second image processing apparatuses to allow communications therebetween, having an allocation reading function for integrating first image data acquired by reading a first document set by the first image processing apparatus and second image data acquired by reading a second document set by the second image processing apparatus to generate integrated image data of the document sets, wherein said first image processing apparatus comprises:

a first image reading unit for reading the image of the first document set to acquire image data; and a first transmission controller for sending a signal relating to the allocation reading function to the second image processing apparatus, wherein said second image processing apparatus comprises:

a second image reading unit for reading the image of the second document set to acquire image data;

a display controller for displaying on its own display an operation key for a user specification relating to the allocation reading function by receiving the signal relating to the allocation reading function from the first image processing apparatus; and a reading controller for executing, upon actuation of the displayed operation key by a user, reading of the second document set by the second image reading unit.

16. An image processing system, as claimed in claim 15, wherein said second image processing apparatus includes:

a second transmission controller for sending second image data acquired by reading the second document set to the first image processing apparatus, wherein said first image processing apparatus includes:

a reception controller for receiving the second image data from the second image processing apparatus; and an integration controller for integrating the received second image data with the first image data acquired by reading the first document set by the first reading unit to generate integrated image data of the document sets.

17. An image processing system as claimed in claim 15, wherein its own display of the second image processing apparatus is the display unit on the operation panel of the second image processing apparatus.

\* \* \* \* \*